No. 898,048. PATENTED SEPT. 8, 1908.
J. H. HART.
ICE CREAM FREEZER.
APPLICATION FILED OCT. 28, 1907.
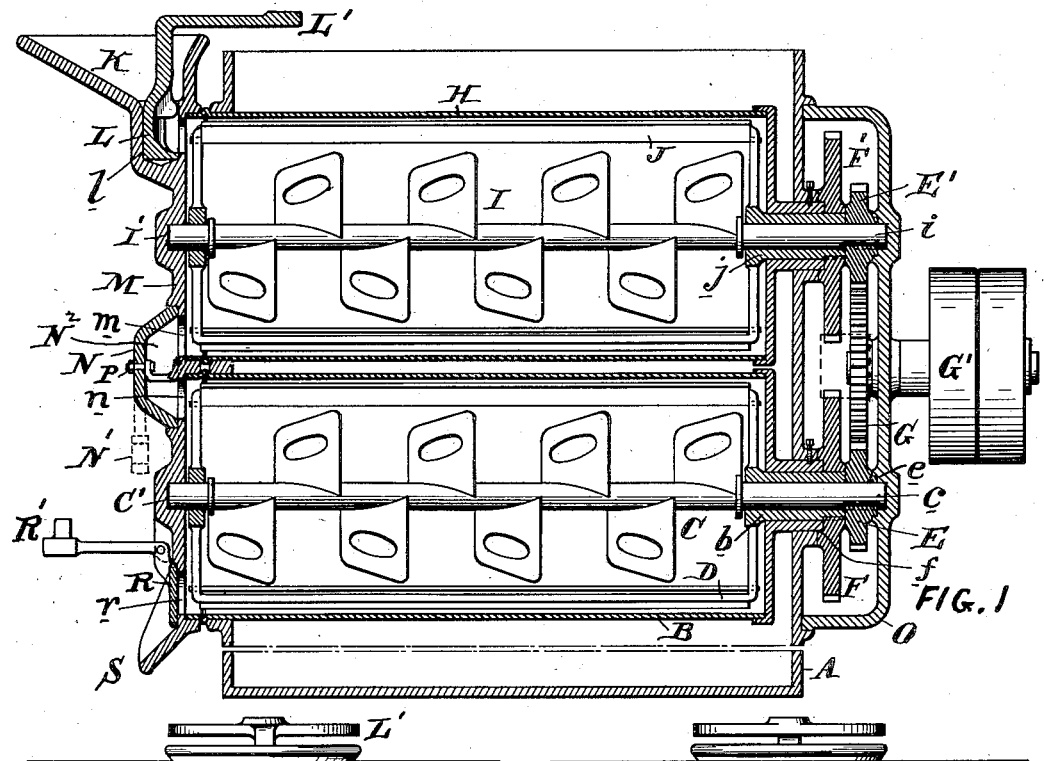
FIG. 1
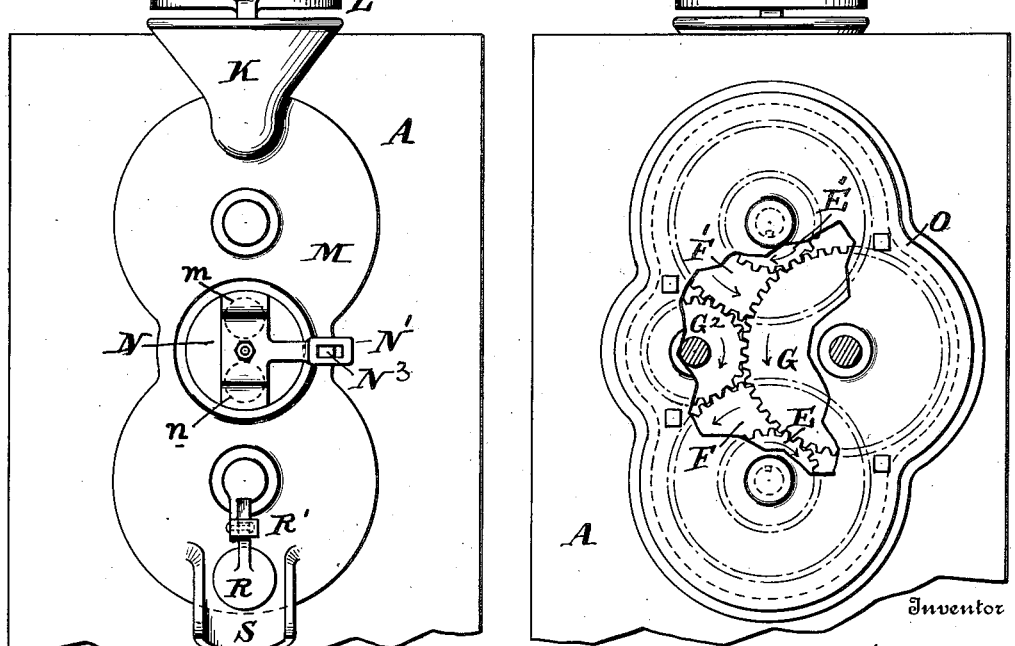
FIG. 2
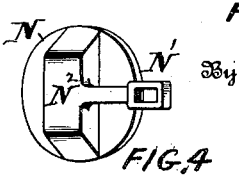
FIG. 4
FIG. 3
Witnesses
Dan'l Webster Jr.
A. M. Kelly
Inventor
Joseph H. Hart
By
Attorney

UNITED STATES PATENT OFFICE.

JOSEPH H. HART, OF PHILADELPHIA, PENNSYLVANIA.

ICE-CREAM FREEZER.

No. 898,048.　　　Specification of Letters Patent.　　　Patented Sept. 8, 1908.

Application filed October 28, 1907. Serial No. 399,426.

*To all whom it may concern:*

Be it known that I, JOSEPH H. HART, of the city and county of Philadelphia and State of Pennsylvania, have invented an Improvement in Ice-Cream Freezers, of which the following is a specification.

My invention has reference to ice-cream freezers, and consists of certain improvements which are fully set forth in the following specification and shown in the accompanying drawings, which form a part thereof.

The object of my invention is to provide a form of machine in which the making of ice-cream may be carried on continuously in the most effective manner, namely, by reducing the time required for bringing the cream mixture to the desired degree of consistency and low temperature to complete the product.

My invention consists in providing a main freezer vessel with an auxiliary freezer vessel arranged above it, and in which latter the cream mixture is first reduced in temperature and partly brought to the consistency ultimately required, and from which auxiliary freezer vessel the mixture, in semi-frozen condition, may be transferred into the lower or main freezer vessel where the freezing operation is completed, the transference taking place through a suitable valve device arranged between the two freezer vessels or compartments.

My invention also comprehends details of construction which, together with the features above specified, will be better understood by reference to the drawings, in which:—

Figure 1 is a longitudinal, vertical, sectional view of an ice-cream freezer embodying my invention; Fig. 2 is an elevation of the feeding end of the same; Fig. 3 is an elevation of the driving end of the same; and Fig. 4 is a perspective view of the transference valve removed from the machine.

A is the main tank, which is adapted to contain the freezing mixture such as crushed ice and salt with or without water as desired.

B is a cylindrical main freezing vessel and extends horizontally across the interior of the tank A and is secured at each end thereto in a fixed manner. This vessel is provided with a beater C and a scraper D such as is employed in ice-cream freezers. The scraper is provided with a tubular extension $b$ which extends through the end of the freezer vessel B and tank A and detachably fitted to a gear F which is journaled at $f$ upon the end of the neck of the can or vessel B where it extends through the side of the tank A. The connection between the tubular extension and the gear F is by the usual well known groove and spline. The spindle of the beater C extends through the tubular extension $b$, as at $c$, and is detachably connected by a groove and spline with a pinion E, which latter is supported in position, having a bearing $e$ in the casing O which incloses the gearing and which is bolted to the side of the tank A. By means of these detachable connections, the beater and scraper may be withdrawn from the can or vessel B while leaving the gears in proper relative position and adapted to again receive these parts when replaced in position.

Arranged above the freezing vessel B is an auxiliary receiving and freezing vessel H which may be of the same general construction and secured in the tank A in a similar manner. This auxiliary vessel is also provided with a beater I and a scraper J similar to the corresponding parts in the main vessel B. The tubular extension $j$ of the scraper is adjustably connected with a gear F' in the same manner as in the case of the main vessel. Likewise the beater spindle $i$ forms a detachable connection with the pinion E' as in the case of the main vessel. The gear F' and the pinion E' are journaled in relatively fixed relation in the same manner as are the gear F and pinion E before referred to.

The gears E E' are connected together by a gear G which is driven by a band-wheel G'. The gears F F' are connected by means of a pinion $G^2$, which pinion is also made wide enough to engage the gear G so that the said beaters D and J are caused to revolve in the opposite direction of the corresponding beaters C and I and at a much lower speed.

The ends of the vessels B and H, most distant from the gearing, extend through the side of the tank A and are open for their full diameter, so that the beaters and scrapers can be withdrawn for cleaning purposes. Fitting over the ends of these vessels B and H is a cap plate M which contains three valves for controlling the supply, transference and discharge of the cream mixture and ice-cream. The ends of the beater spindles are journaled in this cap plate respectively at C' and I'. At the extreme upper part of this plate M is provided a hopper K terminating at the bottom in a valve-seat $l$ and opening into the upper part of the vessel H. A vertical valve L is fitted to the valve-seat l in the form of a plug and which may be rotated for opening or closing communication between the hopper K and the vessel H. The upper end of this valve L is provided with a handle L' which is extended in the form of a wide plate adapted to cover the hopper K to a large extent, so that the operator may know when the valve is closed or open. If the plate handle L' is turned over the hopper, he will know that he must not pour the cream. While I prefer this form of a valve, it may be made in any other suitable manner if so desired. The cap plate M is also provided with an outlet m from the lower part of the upper vessel H and an inlet n into the upper part of the lower vessel B. Covering the outlet and inlet is a cylindrical valve N which is held in position on the cap plate by a pivoted bolt P. This valve N furthermore is provided with a channel $N^2$ which when turned vertically forms a passageway between the outlet m and the inlet n, so that the contents of the vessel H may flow from the outlet m through the channel $N^2$ and through the inlet n into the lower vessel B. This is to enable the contents of the upper vessel to be transferred into the lower vessel. If the valve N is turned by the handle N' into a position in which the channel is horizontal, then the flat portion of the valve N closes the outlet m and the inlet n. In this manner, the contents of the upper can may be readily transferred to the lower can without opening the cans and practically without stopping the operation of the machine. The cap plate M is also provided at its lower part with an outlet r forming a communication with the lower part of the lower vessel B through which the contents of this vessel may be discharged and delivered from a spout S into the cans in which the ice-cream is stored in the cold storage room. This outlet r is normally closed by a pivoted valve R which has an arm R' which acts as a weight to hold it closed. When the valve R is opened to discharge the frozen mixture from the vessel B, the valve N should be turned to close communication between the two vessels H and B and in which position the handle N' will be directed downward, as indicated in dotted lines in Fig. 1. When the handle R' of the valve R is raised, it locks in the slot $N^3$ of the handle N' of the valve N and holds the said valve against being opened so long as the valve R is opened. In this manner, the operator is insured against permitting the more fluid contents of the vessel H from flowing down into the vessel B and out of the outlet r. The valve R as well as the valve N may be made in any other suitable manner than what is shown, if so desired.

In the operation of this ice-cream freezer, advantage is taken of the refrigerant to not only cool the cream mixture before it is fed to the machine in which the mixture is brought to the proper consistency and low temperature, but by means of the mechanical devices shown in connection with the vessel H the cream mixture may be not only greatly cooled but also beaten to a consistency which requires very little additional treatment in the lower vessel B before it is in a completed form to be discharged. By means of my improved apparatus, I greatly facilitate the production of ice-cream and reduce the time required very materially, and which reduces the cost of production on a large scale.

While I have shown my machine in the form in which I prefer to make it for commercial use, the minor details thereof may be modified without departing from the spirit of the invention.

Having now described my invention, what I claim as new, and desire to secure by Letters Patent, is:—

1. In an ice-cream freezer, the combination of a tank to contain the refrigerant, with two vessels arranged horizontally one above the other in the tank and adapted to be cooled by the refrigerant therein, means in each of the vessels for beating the contents thereof, a valved passage for supplying cream mixture to the upper vessel, a transference valve device for controlling the passage of the contents of the upper vessel into the lower vessel, and a valved discharge passage for permitting the contents of the lower vessel to be discharged outside of the tank.

2. In an ice-cream freezer, the combination of a tank to contain the refrigerant, with two vessels arranged horizontally one above the other in the tank and adapted to be cooled by the refrigerant therein, means in each of the vessels for beating the contents thereof, a valved passage for supplying cream mixture to the upper vessel, a transference valve device for controlling the passage of the contents of the upper vessel into the lower vessel, a valved discharge passage for permitting the contents of the lower vessel to be discharged outside of the tank, and means whereby the discharge valve for the lower vessel may when in the open position lock the transference valve device in its closed position.

3. In an ice-cream freezer, a vessel in which the cream is beaten and cooled, combined with a hopper for supplying the cream to the vessel, and a valve between the hopper and the vessel for controlling the flow of cream into the vessel provided with an extended plate adapted to be turned over and close the hopper when the valve is closed and vice versa.

4. In an ice-cream freezer, the combination of two vessels in which the cream is beaten and frozen arranged one above the other, combined with a cap plate fitting over the ends of the vessels and having an outlet port from the upper vessel and an inlet port to the lower vessel and a transference valve consisting of a circular plate rotatably supported on the cap plate over the said ports to close them and having a transverse channel which may be brought into alinement with the two ports to form a passageway for the discharge of the contents of the upper vessel downward into the lower vessel.

5. In an ice-cream freezer, the combination of a tank for the refrigerant, two vessels arranged one above the other horizontally in said tank, a beater and a scraper for each of the vessels journaled concentrically and respectively having parts extending through the vessels, and gearing for rotating the said beaters and scrapers held in operative position outside of the tank and adapted to receive and detachably connect with the extended parts of the beaters and scrapers for driving them whereby the beaters and scrapers may be withdrawn from the vessels and gearing for cleaning and the gearing be retained in normal position so as to again receive the extended parts of the beaters and scrapers.

6. In an ice-cream freezer, the combination of the tank for the refrigerant, two horizontal vessels arranged one above the other, beaters and scrapers within the said vessels and having extensions through the side of the tank, gearing detachably connected upon the ends of the extensions of the beaters, gearing detachably connected upon the ends of the extensions of the scrapers, driving gearing meshing with the gearing of the beaters to rotate them, and a gearing meshing with the last mentioned gear and also with the gears of the scrapers whereby the scrapers rotate in opposite directions and at a slower rate of speed than that of the beaters.

In testimony of which invention, I have hereunto set my hand.

JOSEPH H. HART.

Witnesses:
R. M. KELLY,
M. F. DRISCOLL.